Dec. 4, 1928.
W. C. HARTMANN
1,693,920
ADJUSTABLE CASTER
Filed Dec. 1, 1927
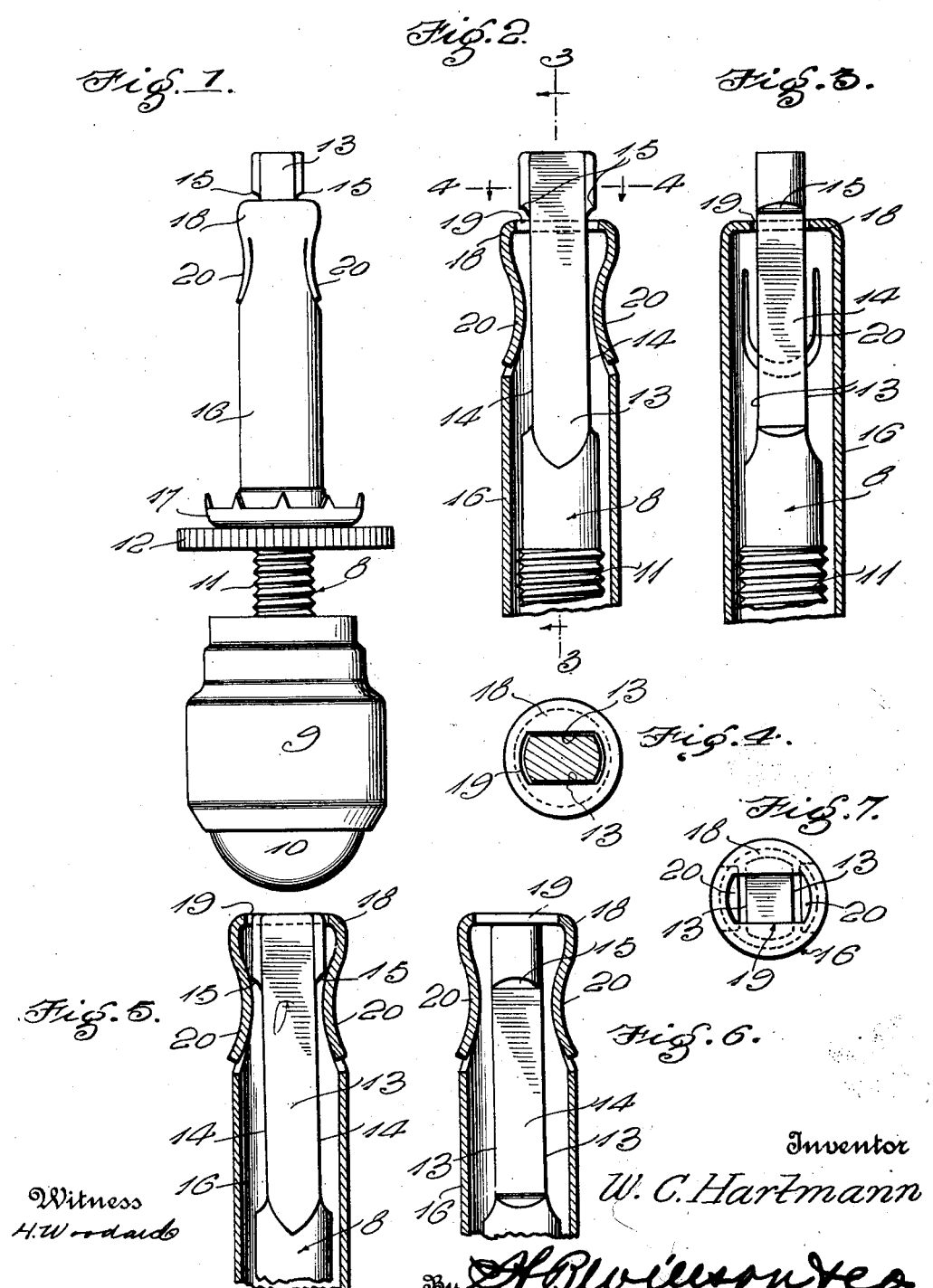

Patented Dec. 4, 1928.

1,693,920

UNITED STATES PATENT OFFICE.

WILLIAM C. HARTMANN, OF CLEVELAND, OHIO.

ADJUSTABLE CASTER.

Application filed December 1, 1927. Serial No. 237,019.

The invention relates to improvements in casters for furniture, adjustable to compensate for slight variances in the length of furniture legs, or inaccuracies in the floor upon which the furniture must rest.

It is one object of the invention to provide a rather simple and inexpensive, yet an efficient and desirable caster of the type set forth, in which a caster-carried shank may be vertically adjusted by a nut and in which novel provision is made for holding said nut against rotating out of proper adjustment.

The shank is non-rotatably received in a tube adapted to be mounted in a bore in a furniture leg or other furniture portion, and it is a further object of the invention to provide novel means whereby the shank and tube are held against accidental disconnection, but may be easily disconnected from each other when desired.

With the foregoing in view, the invention resides in the novel subject matter hereinafter described and claimed, description being accomplished by reference to the accompanying drawing.

Fig. 1 is a side elevation of a caster constructed in accordance with my invention.

Fig. 2 is an enlarged vertical sectional view through the upper portion of the device.

Fig. 3 is a vertical section on line 3—3 of Fig. 2.

Fig. 4 is a horizontal sectional view on line 4—4 of Fig. 2.

Fig. 5 is a view similar to Fig. 2 but illustrating the manner in which the shank is prevented from accidentally dropping out of the tube in which it is received.

Fig. 6 is a view similar to Fig. 5 but illustrating a step in the removal of the shank from the tube.

Fig. 7 is an upper end view of the parts seen in Fig. 6.

In the drawing above briefly described, the numeral 8 denotes a caster-carried shank whose carrying caster preferably comprises a socket 9 and a ball 10 mounted therein, in any desired manner. The lower portion of the shank 8 is provided with screw threads 11 upon which a knurled nut 12 is mounted for vertical adjustment. The upper portion of the shank 8 is provided with two opposed flat sides 13 which are spaced apart a distance less than the sides 14 at right angles thereto, and at the upper ends of these sides 14, said shank is provided, with two downwardly facing shoulders 15, for a purpose to appear.

A tube 16 for reception in a bore in the lower end of a furniture leg or other furniture portion, receives the shank 8 and is provided at its lower end with the usual toothed flange 17 to be driven into the furniture leg or the like, for the purpose of holding the tube against rotation. This tube rests directly upon the nut 12 and co-acting portions are provided on said tube and the shank 11 to hold the latter against rotation in said tube, so that there is no possibility of the nut 12 moving out of adjustment.

In the present showing, the upper end 18 of the tube 16, is formed with a flat-sided slot 19 through which the upper end of the shank 8 passes, the parallel flat sides of said slot being in contact with the flat sides 13 of the shank, so that shank and tube are held against relative turning. The sides of the tube 16, under the ends of the slots 19, are provided with inwardly bowed, spring tongues 20 which are in the downward paths of the shoulders 15 to prevent accidental dropping of the shank 8 from the tube 16, when the furniture is lifted, or prior to installation of the caster. The relation of parts is such that when the shoulders 15 initially come in contact with the spring tongues 20, the upper extremity of the shank 8 is still in the slot 19, as shown in Fig. 5. Hence, the shank cannot turn to dispose its sides 13 adjacent the tongues 20 and consequently said shank cannot accidently drop from the tube. When the parts are in this relation however and it is desired to withdraw the shank from the tube, a slight downward pull upon said shank will cause sufficient outward springing of the tongues 20 to dispose the upper extremity of the shank at the lower side of the tube end 18. Then, the shank 8 may be easily turned in the tube 16 to dispose its flat sides 13 adjacent the tongues 20, and as said sides are spaced apart a distance less than the distance between said tongues, the shank may be readily withdrawn from the tube. When inserting the shank in the tube, it is inserted in the position shown in Fig. 6, is then turned a quarter of a revolution, and is finally passed upwardly through the slot 19.

By providing the novel construction shown and described, a caster is provided which may be readily assembled or disassembled, may be readily adjusted as occasion may demand, and will be desirable from a number of standpoints. On account of the excellent results obtainable from the details disclosed, they are preferably followed. However, within the scope of the invention as claimed, variations may be made.

I claim:—

1. In a caster, a vertical caster-carried shank having opposed flat sides at its upper portion, a nut threaded on the lower portion of said shank, and a tube resting on said nut and having a flat-sided slot in its upper end through which the flat-sided upper portion of said shank passes slidably but non-rotatably, the side portions of the tube under the ends of said slot having inwardly bowed spring tongues, said shank being provided with downwardly facing shoulders to contact with said tongues and prevent accidental disconnection of tube and shank.

2. In a caster, a vertical caster-carried shank having opposed flat sides at its upper portion, a nut threaded on the lower portion of said shank, and a tube resting on said nut and having a flat-sided slot in its upper end through which the flat-sided upper portion of said shank passes sildably but non-rotatably, the side portions of the tube under the ends of said slot having inwardly bowed spring tongues, said shank being provided with downwardly facing shoulders to contact with said tongues and prevent accidental disconnection of tube and shank, the distance between said shoulders and the upper end of the shank being such that slight downward shifting of said shank after initial contact of said shoulders with said tongues, will move the shank entirely out of said slot, permitting turning of said shank for easy withdrawal from the tube, the distance between said flat sides of the shank being less than the distance between said tongues.

3. In a caster, a vertical caster-carried shank having opposed flat sides at its upper portion, a nut threaded on the lower portion of said shank, and a tube resting on said nut and having a flat-sided slot in its upper end through which the flat-sided upper portion of said shank passes slidably but non-rotatably.

In testimony whereof I have hereunto affixed my signature.

WILLIAM C. HARTMANN.